Patented Sept. 17, 1929

1,728,350

UNITED STATES PATENT OFFICE

JESSE T. LITTLETON, JR., OF CORNING, NEW YORK, ASSIGNOR TO CORNING GLASS WORKS, OF CORNING, NEW YORK, A CORPORATION OF NEW YORK

REFRACTORY PRODUCT AND METHOD OF MAKING THE SAME

No Drawing. Application filed June 8, 1923. Serial No. 644,245.

This invention relates to a refractory material, which, while especially suitable for use in lining glass melting tanks, pots, and other like containers, because of its high resistance to the corrosive action of glass, is also suitable for use wherever a refractory capable of resisting the corrosive action of molten slags or hot vapors is desired.

Silicate refractories containing alumina and silica in certain proportions have the property of resisting the corrosive action of glass and other molten metals to a marked degree, especially when formed by melting the raw materials in an electric furnace and casting the molten material in suitable molds. However, castings consisting chiefly of alumina and silica alone show a large shrinkage on cooling and tend to crystallize in large crystals parallel to each other and perpendicular to the outer surface.

When there is a definite crystal orientation in the castings, it has been found that cracks are very likely to occur along the crystals, taking place between the crystals. That is to say, the crystals are not very definitely cemented together. Furthermore, in cooling the castings, very high forces are set up which tend to rupture the body and these forces cause cracks to form between crystals.

When the castings have a definite crystal orientation, a crack can spread over a large region in a plane and follow the space between crystals, but if the crystals have a heterogeneous arrangement the incipient crack will butt up against the side of a crystal, and will not be able to spread any further without breaking the crystal. In other words, crystal planes in castings made from molten silicate refractories are planes of weakness, and by destroying these planes of weakness the material is strengthened.

By this invention the refractory material is first heated until it is liquid, and then the liquid is poured into molds. Any approved method and apparatus may be used for this purpose, but the molds should be so designed that the castings can be cooled as slowly as possible.

When the molten material is being poured into the molds, small crystalline lumps (about the size of grains of wheat) of unmelted material with approximately the same constituents as used in the molten material, are added either to the stream, or sprinkled into the mold while the stream is falling thereinto. This granular material should be thoroughly mixed with the liquid before the latter sets so that the lumps will be distributed as evenly as possible through the casting.

In this manner, when the molten material sets the granular material will be so disposed with respect to the crystals that large crystals parallel to each other will be prevented from forming, and the crystals which do form will have a heterogeneous arrangement. Therefore crystallization stresses will be broken up so that these stresses will no longer act over a material section of the casting.

I have found as the result of my invention that a casting produced according to the method I have described above, will have a very dense structure, and therefore the refractory power will be greater than the open crystalline materials formerly produced.

Having thus described my invention what I claim is:

1. The method of manufacturing refractory material which comprises the steps of heating suitable material until it is molten, then pouring the molten material into a mold, adding to the molten material granular particles of unmelted material of approximately the same constituents as the molten material and so cooling the molten mass with the granular unmelted particles therein that a crystalline mass is formed in which the crystals are heterogeneously arranged.

2. The herein described refractory product consisting of a heterogeneous arrangement of crystals of fused silicate materials solidified in situ around unmelted particles of the same composition.

3. The herein described crystalline refractory having a heterogeneous arrangement of crystals, said refractory being composed of fused silicate materials solidified around particles of unmelted crystalline silicate material.

4. A crystalline refractory casting composed of fused silicate materials homogeneous in composition and with a heterogeneous arrangement of crystals.

5. A crystalline refractory casting composed of fused silicate materials having a heterogeneous arrangement of crystals.

6. A crystalline refractory article composed of fused silicate materials having a heterogeneous arrangement of crystals formed by adding particles of unmelted crystalline silicate material to molten material.

In testimony whereof I hereunto sign my name this 7th day of June 1923.

JESSE T. LITTLETON, Jr.